US010356852B2

(12) United States Patent
Villemin et al.

(10) Patent No.: US 10,356,852 B2
(45) Date of Patent: Jul. 16, 2019

(54) PLANT AND METHOD FOR MELTING METAL MATERIALS

(71) Applicant: DANIELI & C. OFFICINE MECCANICHE SPA, Buttrio (IT)

(72) Inventors: Bernard Villemin, Eggenwil (CH); Stefano Morsut, Udine (IT); Andrea Codutti, Frazione Brazzacco (IT); Fabio Guastini, Dolegna del Collio (IT)

(73) Assignee: DANIELI & C. OFFICINE MECCANICHE SPA, Buttrio (IT)

(*) Notice: Subject to any disclaimer, the term of this patent is extended or adjusted under 35 U.S.C. 154(b) by 164 days.

(21) Appl. No.: 15/115,824

(22) PCT Filed: Jan. 30, 2015

(86) PCT No.: PCT/IB2015/050710
§ 371 (c)(1),
(2) Date: Aug. 1, 2016

(87) PCT Pub. No.: WO2015/114579
PCT Pub. Date: Aug. 6, 2015

(65) Prior Publication Data
US 2017/0171919 A1    Jun. 15, 2017

(30) Foreign Application Priority Data
Jan. 31, 2014  (IT) .............................. UD2014A0015

(51) Int. Cl.
*F27D 13/00*  (2006.01)
*H05B 6/02*  (2006.01)
(Continued)

(52) U.S. Cl.
CPC ............... *H05B 6/02* (2013.01); *C21C 5/527* (2013.01); *C21C 5/56* (2013.01); *C21C 5/565* (2013.01);
(Continued)

(58) Field of Classification Search
CPC ... H05B 6/00; H05B 6/02; H05B 6/06; H05B 6/067; H05B 6/103; H05B 6/104;
(Continued)

(56) References Cited

U.S. PATENT DOCUMENTS 4,403,327 A    9/1983  Granstrom
5,940,427 A *  8/1999  Hurtgen .................. H05B 6/24
                                                              373/139
(Continued)

FOREIGN PATENT DOCUMENTS

DE    3026720 A1    2/1982
JP    6092411 A1    5/1985
(Continued)

OTHER PUBLICATIONS

International Preliminary Report on Patentability for corresponding application PCT/IB2015/050710 filed Jan. 30, 2015; dated May 10, 2016.
(Continued)

*Primary Examiner* — Hung D Nguyen
(74) *Attorney, Agent, or Firm* — Cantor Colburn LLP

(57) ABSTRACT

Plant for melting metal materials comprising at least a heating unit (11) provided with a container (13) to contain the mainly metal materials and with at least an induction heating device (22) configured to heat the mainly metal materials contained in the container (13). The plant also comprises a transfer unit (25) disposed downstream of the heating unit (11) and configured to move, substantially continuously, the mainly metal solid materials exiting from
(Continued)

the heating unit (11) to a melting furnace (12). The container (13) is provided with an aperture (16) through which the mainly metal material, heated and in a solid state, is discharged onto the transfer unit (25), and opening/closing members (17) are associated with the aperture (16), commanded by an actuator (19) and configured to open, close and choke the aperture (16) in order to regulate the delivery of the metal materials that is discharged onto the transfer unit (25).

11 Claims, 4 Drawing Sheets

(51) Int. Cl.
  *C21C 5/56*    (2006.01)
  *F27B 3/18*    (2006.01)
  *F27D 3/10*    (2006.01)
  *H05B 6/06*    (2006.01)
  *C21C 5/52*    (2006.01)
  *F27B 1/00*    (2006.01)
  *H05B 7/00*    (2006.01)
  *F27D 3/00*    (2006.01)

(52) U.S. Cl.
  CPC ............... *F27B 1/00* (2013.01); *F27B 3/18* (2013.01); *F27D 3/10* (2013.01); *F27D 13/002* (2013.01); *H05B 6/067* (2013.01); *H05B 7/00* (2013.01); *C21C 5/5241* (2013.01); *Y02P 10/216* (2015.11); *Y02P 10/253* (2015.11)

(58) Field of Classification Search
  CPC .......... H05B 6/105; H05B 6/36; H05B 6/365; H05B 6/44; H05B 7/00; F27D 13/002; F27D 3/10; F27B 3/085; F27B 3/12; F27B 3/18; F27B 3/183; F27B 3/28; F27B 1/00; C21C 5/5252; C21C 5/527; C21C 5/565; C21C 5/56; C21C 5/5241; Y02P 10/216; Y02P 10/253
  USPC ...... 373/79, 80, 81, 144, 151, 152; 219/653, 219/654, 656, 662, 671
See application file for complete search history.

(56) References Cited

U.S. PATENT DOCUMENTS

| | | | |
|---|---|---|---|
| 6,389,054 B1 * | 5/2002 | Stercho | ............... F27B 3/18 373/79 |
| 7,905,940 B2 | 3/2011 | Edlinger | |
| 2011/0272866 A1 * | 11/2011 | Shameli | ............... F27B 3/085 266/78 |
| 2016/0003542 A1 * | 1/2016 | Huang | ............... C21C 5/527 373/81 |

FOREIGN PATENT DOCUMENTS

| | | | |
|---|---|---|---|
| JP | 8-83676 A | * | 3/1996 |
| WO | 2008087244 A1 | | 7/2008 |
| WO | 2009005755 A1 | | 1/2009 |

OTHER PUBLICATIONS

International Search Report for corresponding application PCT/IB2015/050710 filed Jan. 30, 2015; dated Jan. 5, 2016.
Written Opinion for corresponding application PCT/IB2015/050710 filed Jan. 30, 2015; dated Jan. 5, 2016.

* cited by examiner

PLANT AND METHOD FOR MELTING METAL MATERIALS

FIELD OF THE INVENTION

The present invention concerns a plant and method for melting metal materials.

In particular, the plant according to the present invention is provided with feed members with means to heat the metal material before it is introduced into a melting furnace.

The present invention can be applied, although not exclusively, for the production of steel or cast iron.

BACKGROUND OF THE INVENTION

In the field of iron and steel-making, melting containers, also called melting furnaces, for the production of liquid metal, are well known.

Melting furnaces are typically fed with solid materials that contain a high concentration of the metal to be produced. The final composition of the liquid metal is adjusted by adding other metal or non-metallic compounds and very often with materials that have a high carbon content.

Melting and refining furnaces can generally be divided into two types:

electric furnaces that use electric energy as a source of additional energy to the chemical energy generated by the melting processes;

heat furnaces that do not use electric energy and use only heat sources; if additional energy is required in addition to the chemical energy produced by the refining reactions, burners are used for example.

The types of electric furnaces most often used can comprise electric arc furnaces, induction furnaces, resistance furnaces. A variant of electric arc furnaces, with regard to the production of iron alloys, is the submerged arc furnace.

Heat furnaces can comprise oxygen converters, Martin-Siemens furnaces and cupola furnaces.

After the primary melting step of the metal, a refining step is provided. Usually different alloy materials are added to the molten material, to obtain the required chemical composition.

In all these processes, during the melting and refining steps, all or only some of the materials to be melted can be loaded. The melting and refining steps are also called "power on charging", and correspond to the time during which heat/electric energy is supplied to the melting furnace.

During this step the materials can be loaded into the melting furnace by a conveyor that adjusts the delivery rate thereof.

During the power on charging, the limitation of the delivery rate depends on the requirements of heat energy specific for melting: the higher the specific melting energy required, the lower will be the delivery rate and the productivity of the melting furnace.

In order to reduce the duration of the melting process, it is also known to heat the material before it is loaded into the melting furnace.

One well-known technology for heating the metal material exploits the principle of magnetic induction.

The magnetic induction heating technique is normally used in the fields of melting, heat treatments, molding and welding.

One example application of the magnetic induction heating technique, regarding the melting process of metal materials, is the induction furnace.

An induction furnace can consist of a melting container, usually made of ceramic material, with a cylindrical shape and to which induction heating devices are associated. The induction heating devices normally comprise at least one coil disposed around the melting container, which is powered by alternate current at a suitable frequency. The coil can consist of a tube wound in spirals in which a cooling fluid, usually water, is made to circulate, to preserve the properties of mechanical resistance thereof.

The alternate electric current circulating in the coil generates an alternate induced magnetic field in the melting container and generates induced currents in any conductive metal material that is struck by the magnetic field induced. The currents induced in the conductive metal material in their turn generate heat energy due to the Joule effect.

With regard to the technique of heating a metal mass by induction, the metal product can be heated by means of longitudinal flux induction or transverse flux induction.

In the case of longitudinal flux induction, the coils and magnetic yokes, which make up part of the heating devices, are disposed in such a way as to concentrate the magnetic field induced along the longitudinal development of the material to be heated. In this case the heating of the metal material occurs along the axis of the coil. A similar example of heating the metal material, by the action of the longitudinal magnetic field, is the one which occurs in an induction melting furnace.

In the case of transverse flux induction, the components of the heating device are disposed on opposite sides of the metal material to concentrate the oscillating magnetic field through the material to be heated. In this case, the main heating action occurs on the surface of the metal material.

With regard to the heating of the metal material before it is loaded into a melting furnace, a process and a plant are known, for example from U.S. Pat. No. 4,403,327, in which the scrap or other metal material is first heated by induction in a first container and is then loaded into a second container to be melted, again exploiting the induction principle.

The metal material exiting from the first container is still in a solid state and is transferred to the second container for example by loading baskets.

The loading baskets provide a direct, uncontrolled and immediate feed of the metal material directly into the second container.

This is particularly disadvantageous because it is not possible to suitably and continuously control the ways in which the metal material, inserted into the furnace during the whole melting process, is introduced.

In fact, a continuous control of the quantity of material inserted would prevent the mass of already molten metal from being subjected to drastic reductions in temperature.

Document U.S. Pat. No. 7,905,940 instead describes a continuous refining method for metal materials that provides to use an inductor coil to heat and melt the metal material contained in a melting container in order to reduce the metal oxides and vitreous components. Gas can be injected into the metal mass subjected to the refining process in order to produce, in the metal mass, the desired reduction effect. In this case, the metal material is both loaded, heated and melted in the melting container. The process and plant described are particularly complex and difficult to manage because, in the same container, zones are generated in which the material is still solid and zones in which the material is already in a molten state. This leads to a different distribution of the temperature in the container and therefore different critical states can occur in every zone of the container, due for example to the different types of materials used to make the container, the different types of cooling devices, different wear phenomena, and necessary maintenance operations not simultaneous in the various zones, or suchlike.

Document DE 30 26 720 A1 describes an induction heating device for metal material used to melt the material and equipped with a selective closing device that can be opened to cast the molten metal into an ingot mold below.

Document WO 2008/087244 describes a pre-heating device for metal material that uses a plurality of silos fed by a mixture of hot gases. Each silo is connected to the melting furnace by respective feed pipes. The gas cooling system is not very controllable and can lead to the melting of the material, in particular for small pieces.

Document U.S. Pat. No. 4,403,327 A describes an electric power system for an induction heating furnace. The induction furnace has an opening bottom, directly connected to a scrap container sliding on a slider, by means of which the electric melting furnace is fed.

One purpose of the present invention is to obtain a plant to melt metal material that allows to reduce the times of the production cycle.

Another purpose of the present invention is to obtain a plant for melting metal material that allows to reduce the complexity of the plant and its manufacture.

Another purpose of the present invention is to perfect a method to melt metal materials that allows to reduce the times of the melting cycle.

Another purpose of the present invention is to obtain a heating apparatus for metal products, installable in a melting plant, that guarantees to feed the metal material to the melting container in predetermined modes.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a plant for melting metal materials according to the present invention comprises at least a heating unit in which the mainly metal materials are heated. The heating unit is provided with a container to contain the mainly metal materials and with at least an induction heating device configured to heat the mainly metal materials contained in the container, keeping them in a solid state.

The plant according to the present invention also comprises a transfer unit configured to move the mainly metal materials substantially continuously from the heating unit to a melting furnace, located downstream of the heating unit and configured to melt the mainly metal materials.

In accordance with one feature of the present invention, the container is provided with an aperture through which the mainly metal material is discharged Opening/closing members are associated to the aperture, commanded by an actuator and configured to open, close and choke the aperture in order to regulate the flow of the metal materials to the melting furnace.

With the present invention, therefore, it is possible to pre-heat the mainly metal materials before they are introduced into the melting furnace, consequently reducing the times of each melting cycle.

The opening/closing members in turn allow to supply a controlled delivery to the transfer unit on each occasion, depending on the melting process taking place in the melting furnace.

In some forms of embodiment, the opening/closing members comprise a sliding valve connected to the actuator and able to be selectively opened, closed, and choked by the action of the actuator.

In a possible form of embodiment, the opening/closing members are governed by detectors provided to control the flow of the mainly metal materials discharged through the aperture of the container.

In accordance with other forms of embodiment, the detectors and the actuator are connected to a control and management unit configured to correlate at least the data detected by the detector and the process data of the melting furnace and to command the activation of the actuator and control the entity of opening of the sliding valve.

In accordance with one form of embodiment, the induction heating device comprises one or more coils disposed outside the container. Advantageously, said one or more coils are disposed around an axis that coincides with the axis of axial development of the container.

BRIEF DESCRIPTION OF THE DRAWINGS

These and other characteristics of the present invention will become apparent from the following description of some forms of embodiment, given as a non-restrictive example with reference to the attached drawings wherein.

Figure 1:
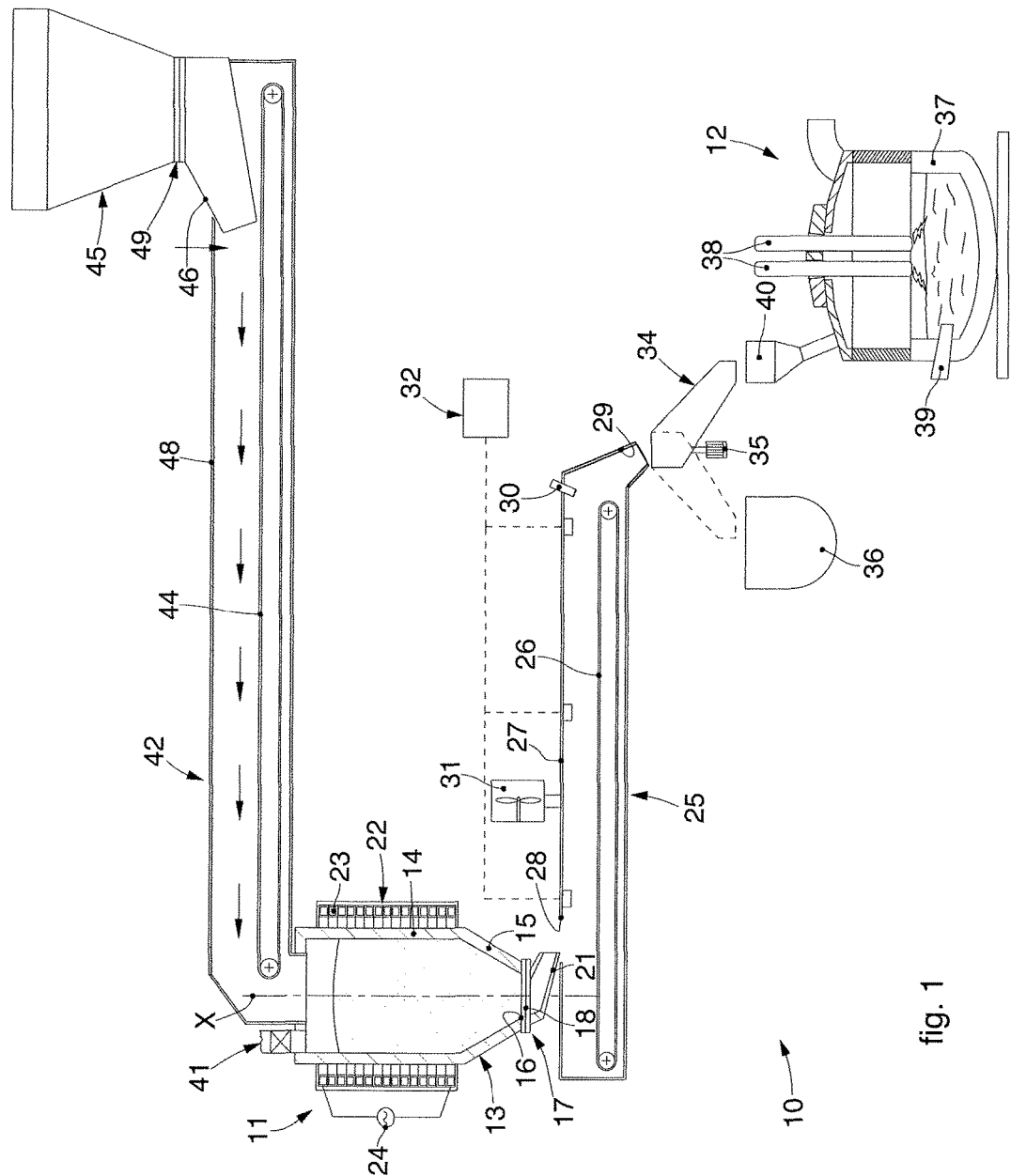
FIG. 1 is a schematic representation of a melting plant for metal materials in accordance with one form of embodiment of the present invention.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

With reference to FIG. 1, a plant to melt metal materials, indicated in its complexity by the reference number 10, is configured to melt mainly metal materials and to obtain metal products with a determinate composition.

The mainly metal materials, hereafter referred to generically as materials, can comprise for example scrap fragmented by shearing or grinding and separated from non-metallic contaminants and possible exogenous metals.

The materials can be fragmented into pieces with a size comprised approximately between 50 mm and 100 mm. This level of fragmentation facilitates the transport and metering of the metal material.

The fragmented scrap has a high density of lumps, a high concentration of base metal and uniform sizes from piece to piece. These properties render the fragmented scrap suitable for induction heating.

The plant 10 according to the present invention comprises at least a heating unit 11 to heat the material and a melting furnace 12 located downstream of the heating unit 11.

The heating unit 11 is configured to heat the material before it is introduced into the melting furnace 12. The entity of the heating to which the material is subjected in the heating unit 11 is such as to keep it in a solid state. Merely by way of example, if the material that is heated is scrap iron, the heating unit 11 is configured to heat it to a temperature comprised between 300° C. and 800° C.

The heating unit 11 comprises at least a container 13 or silo, suitably designed to contain a determinate quantity of material.

The internal walls of the container 13, in which the metal material is contained, can comprise an external layer made for example of austenitic stainless steel to reduce the magnetic screen effect and the thermal load, and an internal layer, or lining, made of electric or heat insulating materials.

In some solutions, the electric and heat insulating materials can be ceramic, refractory or composite materials.

In another form of embodiment, the external layer of the container 13 can be made of austenitic stainless steel with fiber and heat insulating materials, wound externally to reduce heat losses.

In other forms of embodiment, the external layer of the container 13 can be made of non-magnetic materials and materials with low conductivity. However, it is not excluded that, in other forms of embodiment, other types of material can be used to make the walls of the container 13.

The container 13 can comprise a tubular body 14, cylindrical or box-like, in which the metal material is inserted and, toward the bottom, an end portion 15 with a tapered, conical or pyramid-like configuration, to define a hopper for unloading the material.

The inclination and sizes of the walls of the container 13, in particular in its end portion 15, are chosen as a function of the temperature that the material reaches and the sizes of the metal fragments. This allows to reduce problems of blockages or phenomena of sticking against the walls.

The container 13 is provided, in proximity to the bottom, with an aperture 16 through which the material contained therein is discharged.

In accordance with a possible form of embodiment, the heating unit 11 can comprise level sensors 43 configured to control the fullness of the container 13.

The level sensors 43 can comprise ultrasound sensors, television cameras, photocells, optical sensors, inductive sensors, capacitive sensors.

According to one aspect of the present invention, the aperture 16 can be provided with opening/closing members 17 commanded by an actuator 19 and configured to open, close and choke the aperture 16, adjusting the flow of material discharged.

In a possible form of embodiment, the opening/closing members 17 can comprise a sliding valve 18, or guillotine valve, connected to the actuator 19 and can be selectively opened, closed or choked using the actuator 19.

The opening/closing members 17 can also be governed by detectors 20 provided to control the flow of material that passes through the aperture 16 of the container 13.

In some forms of embodiment it can be provided that the detectors 20 and the actuator 19 are connected to a control and management unit which, correlating at least the data detected by the detectors 20 and the process data of the melting furnace 12, commands the activation of the actuator 19 and controls the entity of opening of the sliding valve 18.

In some forms of embodiment, the opening/closing members 17 can comprise a vibrating feeder 21 to facilitate the extraction of the material contained in the container 13.

Figure 2:
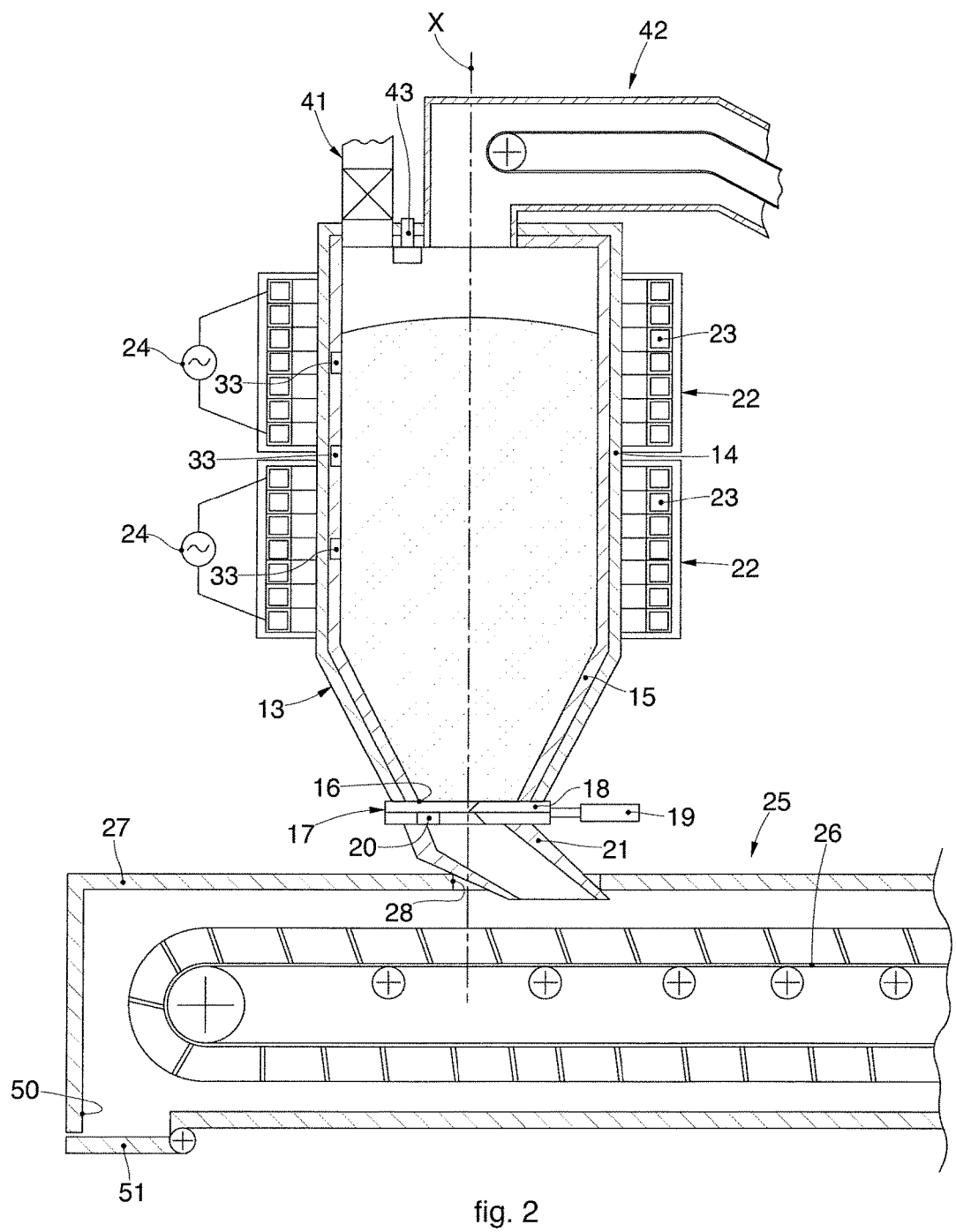
FIG. 2 is a schematic representation of an operative unit of the plant in FIG. 1.

In accordance with possible formulations of the invention, shown for example in FIGS. 1 and 2, the vibrating feeder 21 can have a funnel or hopper configuration and be connected to a vibrating unit for example. The vibrating unit can be, merely by way of example, of the type with eccentric masses.

The heating unit 11 comprises at least an induction heating device 22 mounted on the container 13.

In accordance with possible variants, an example of which is shown in FIG. 2, it can be provided that the heating unit 11 comprises several induction heating devices 22 as will be described hereafter.

Each induction heating device 22 can comprise one or more coils 23 mounted externally to the container 13.

In accordance with a possible solution, the coils 23 can be wound in spirals peripherally and around the walls of the container 13.

In particular, a possible solution provides that the coils 23 are wound around a winding axis X corresponding to the axis of axial development of the container 13.

According to possible formulations of the present invention, the coils 23 can be made of an electrically conductive material, for example copper.

The coils 23 can be defined by one or more pipes, wound in spirals, in which a cooling fluid is made to flow to control the temperature that the material of the coils 23 can reach.

The coil 23 can be formed by a single layer of spirals, as shown for example in FIG. 2, or it can comprise several layers, wound one above the other around the winding axis X.

According to possible formulations of the present invention, the spirals of the coils 23, or at least some of them, can be attached mechanically to a fixed structure, for example against walls of the container 13, to contain the electromagnetic repulsion forces that act on the coil 23.

According to possible forms of embodiment, the spirals of the coils 23 can be electrically insulated.

According to possible formulations of the present invention, the induction heating device 22 can comprise magnetic field concentrator devices that can comprise at least one of either concentrators or magnetic yokes, made with rolled sheets of steel and configured to reduce the electrical resistance of the magnetic circuit.

Each induction heating unit 22 also comprises at least an electric energy generator 24 connected electrically to one or more of the coils 23 to supply them with the electric energy needed to generate the magnetic field.

The electric energy generator 31 can comprise a frequency convertor suitable to vary the frequency and control the current of the coils 23.

According to possible forms of embodiment, the electric energy generator 24 can be configured to supply an alternate electric current with a frequency comprised between 300 Hz and 1,500 Hz. According to a variant form of embodiment, the electric energy generator 24 can be configured to supply an alternate electric current of less than 3,000 Hz.

According to possible formulations of the present invention, and as mentioned above, the heating unit 11 can comprise several induction heating units 22 associated with the container 13 in different positions along the longitudinal extension of the latter. In this way it is possible to differentiate the heating action on the material in the container 13 for different heights of the latter.

This allows to differentiate the entity of the heating along the longitudinal extension, also depending on the quantity of materials contained in the container 13, or in order to determine a gradual heating of the materials.

According to possible forms of embodiment, in order to control the temperature of the materials in the container 13, temperature sensors 33 are associated with the latter.

The temperature sensors 33 can be installed along the walls of the tubular body 14, possibly protruding toward the inside of the coated wall. This allows to monitor the temperature of the heated material in different zones along the longitudinal extension of the container 13.

According to possible forms of embodiment, the heating unit 11 can be connected to a suction unit 41 configured to generate in the container 13 a depression suitable to discharge the gases produced during the heating of the material. The suction unit 41 can be connected in turn to a gas treatment plant in order to purify it.

The connection of the suction unit 41 to the heating unit 11 can comprise pipes for collecting, filtering and taking in the fumes.

According to a possible variant form of embodiment, between the heating unit 11 and the melting furnace 12 a transfer unit 25 can be interposed, configured to transfer the material, with a pre-determined delivery rate and temperature, from the heating unit 11 to the melting furnace 12.

By suitably coordinating the opening, closing or choking of the opening/closing members 17 and the activation of the transfer unit 25, it is possible to guarantee to feed already heated material to the melting furnace 12, either continuously or according to the needs dictated by the individual melting cycle. In this way it is possible to suitably control the melting process, for example preventing sudden variations in temperature of the liquid bath in the melting furnace 12.

The transfer unit 25 can comprise at least one of either a conveyor belt, a cup-type transporter, a plate conveyor belt or a similar and comparable conveyor suitable for the purpose.

According to possible variant forms of embodiment, and if the distances between the heating unit 11 and the melting furnace 12 are limited, the transfer unit 25 can also comprise a vibrating board conveyor.

According to the forms of embodiment shown in FIGS. 1 and 2, the transfer unit 25 comprises a conveyor belt 26 that extends between the heating unit 11 and the melting furnace 12.

The conveyor belt 26 is designed to resist the temperatures of the material coming out from the heating unit 11. The conveyor belt 26 can comprise a metal belt, for example made of steel.

The transfer unit 25 can comprise a protection body 27, or housing, in which the conveyor belt 26, or at least part of it, is inserted and kept substantially hermetically closed.

In fact, according to possible solutions, it can be provided that the protection body 27 encloses inside itself only the active segment of the conveyor belt 26 configured to transfer the metal material.

The function of the protection body 27 is to eliminate, or at least limit, the excessive oxidation of the material transferred through the conveyor belt 26.

According to a possible form of embodiment, the protection body 27 can be provided with at least an introduction aperture 28 and at least a discharge aperture 29 through which the material heated by the heating unit 11 is loaded and respectively discharged to the melting furnace 12.

According to possible forms of embodiment, the protection body 27 can comprise heat-insulating materials to contain the heat losses of the material heated by the heating unit 11.

According to possible forms of embodiment, an injection device 30 is connected to the transfer unit 25, configured to introduce into the protection body 27 a fluid or gas, inert or reducing, suitable to condition the environmental conditions in the latter. This allows to prevent oxidation of the heated metal material that is made to transit through the transfer unit 25. According to possible solutions, the injection device 30 can comprise a plurality of injectors, installed on the protection body 27 in different positions along its longitudinal extension.

According to a variant form of embodiment, which can possibly be combined with the forms of embodiment described here, the transfer unit 25 can be provided with a suction apparatus 31 configured to generate a depression in the protection body 27 and to contain the oxidation effects of the heated metal transported.

According to possible formulations, the suction apparatus 31 can comprise a fan configured to control the depression inside the protection body 27.

The transfer unit 25 can be served by monitoring devices 32 provided to detect at least a blocked condition of the material transported, breakdown of the mechanical components, volumetric quantity of the material transported, weight of the material transported.

The monitoring devices 32 can comprise photocells, TV cameras, optical, inductive, magnetic or similar sensors, possibly controlled and managed by a control unit.

Between the transfer unit 25 and the melting furnace 12 an introduction member 34 is interposed, configured to allow the introduction of the heated material into the melting furnace 12.

The introduction member 34 can comprise for example a slide, located above the melting furnace 12 and that allows the heated material to be discharged through gravity to the melting furnace 12.

According to possible forms of embodiment, the introduction member 34 can be connected to a selector device 35 provided to take the introduction member 34 at least to a first operating position to discharge the material into the melting furnace 12 and a second operating position.

The second operating position of the introduction member 34 can correspond to a position of non-interference of the latter with mobile parts of the melting furnace 12, such as for example the roof that covers the shell of an electric furnace.

According to a variant form of embodiment, for example shown in FIG. 1, the second operating position of the introduction member 34 corresponds to a discharge position of the material into an auxiliary container 36.

If it is not possible to discharge it into the melting furnace 12, for example due to process requirements or conditions connected to the momentary suspension of the melting process, the heated material is discharged into the auxiliary container 36 so as to allow it to be possibly reintegrated later into the melting process, for example in the heating unit 11.

The melting furnace 12 can comprise, merely by way of example, a smelting furnace.

Figure 3:
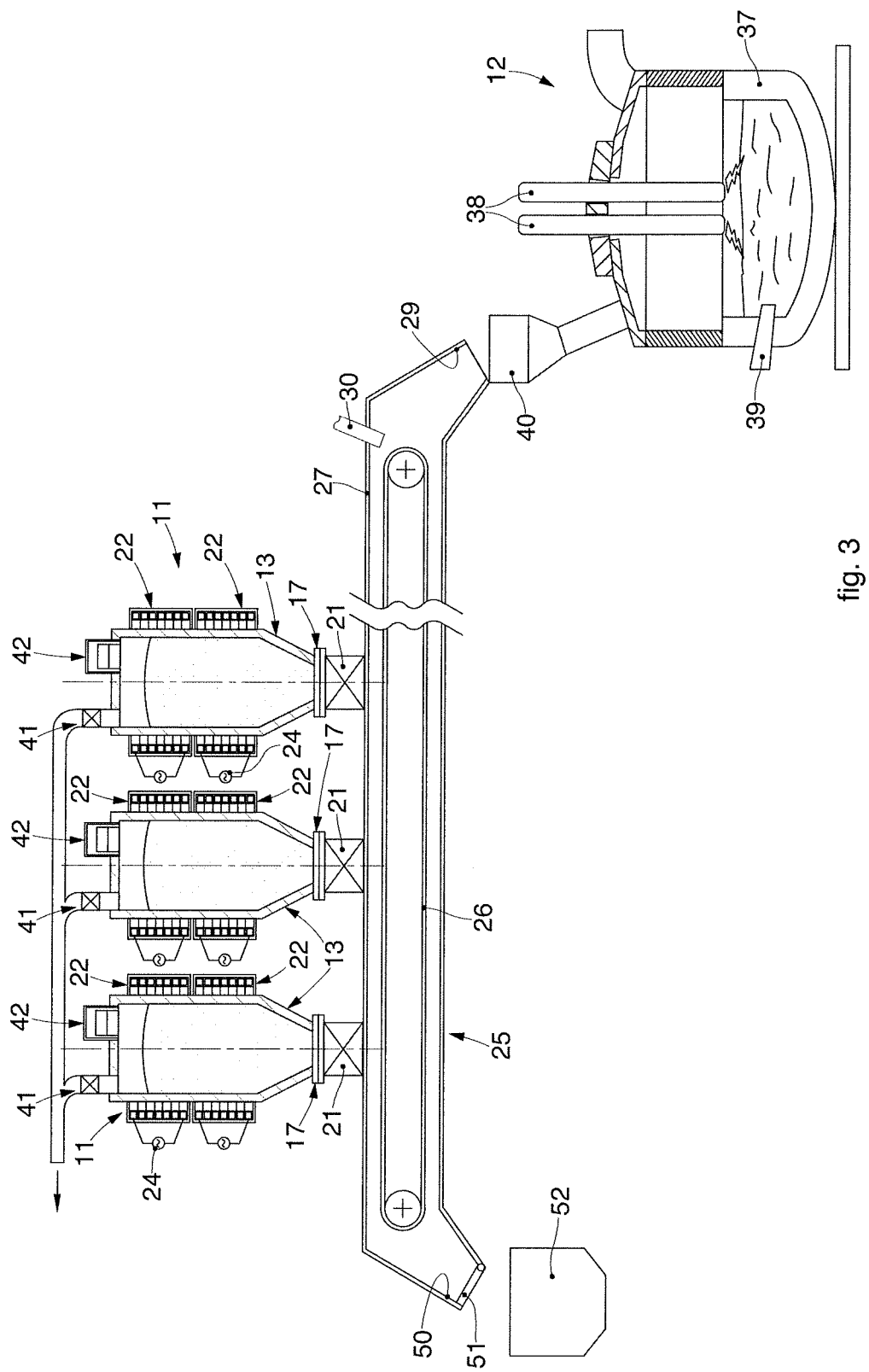
FIG. 3 is a schematic representation of a melting plant for metal materials in accordance with another form of embodiment.

According to the form of embodiment shown in FIGS. 1 and 3, the melting furnace 12 comprises an electric arc furnace 37 provided with electrodes 38 to supply electric power and lances to introduce gas, preferably oxygen, by means of injection devices 39 and to promote the melting and refining reactions.

The electric arc furnace 37 can be provided with introduction means 40 configured to allow the insertion of the heated material.

In particular, the introduction means 40 can comprise a pipe, a hopper, vibrating devices or combinations thereof.

According to possible forms of embodiment, which can possibly be combined with the forms of embodiment described here, the plant 10 according to the present invention can also comprise a loading unit 42 located upstream of the heating unit 11 and configured to feed to the latter the material to be heated.

The loading unit 42 can comprise at least one of either a conveyor belt, plate conveyor belt, loading basket, hopper, grab crane, bridge crane or possible combinations thereof.

If the loading unit 42 comprises one or more loading baskets, these are filled on each occasion with the material, they are transported to the container 13 and finally discharged into the latter.

Figure 4:
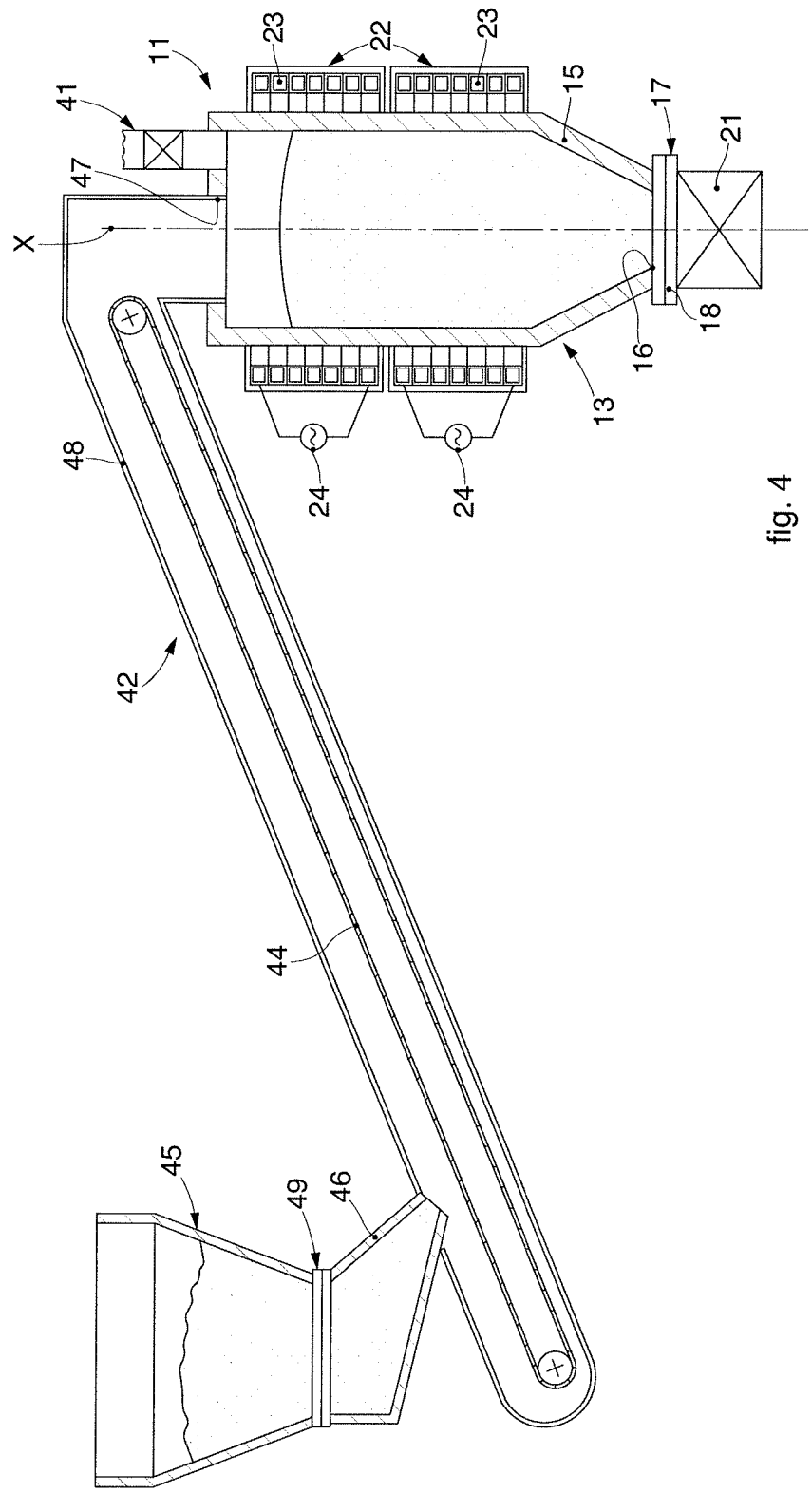
FIG. 4 is a schematic representation of an operative unit of the plant in FIG. 3 in accordance with a possible form of embodiment.

According to possible forms of embodiment, for example shown in FIGS. 1 and 4, the loading unit 42 comprises a conveyor belt 44 and a loading hopper 45 configured to load a determinate quantity of scrap onto the conveyor belt 44.

The conveyor belt 44 can be disposed with its longitudinal development substantially horizontal, as shown in FIG. 1, or inclined as shown in FIG. 4.

The loading hopper 38 can possibly be provided, in correspondence with a discharge aperture, with a vibrating feeder 46 to meter the quantity of material discharged onto the conveyor belt 44 and hence to control the delivery of material loaded into the heating unit 11.

The loading hopper 47 can possibly be served by opening/closing devices 49, such as for example a guillotine valve.

The delivery rate of material can be controlled by modifying the frequency of vibration of the vibrating feeder 46, also according to possible detections that can be made on the conveyor belt 44. In particular, it can be provided to control the weight and/or volume, by means of suitable detectors installed on the conveyor belt 44.

The loading unit 42 is configured to discharge the material through a loading aperture 47 provided in the upper part of the container 13.

In possible formulations of the present invention, the conveyor belt 44 can be at least partly contained in a containing body 49, or housing, to contain the quantity of material that is transferred.

The containing body 48 can be connected directly to the loading aperture 47 so that fumes possibly generated in the container 13, which emerge from the loading aperture 47, are collected and contained in the containing body 48.

To this purpose, suction and fume retention devices can also be associated with the containing body 48, to prevent their unwanted emission into the environment.

With reference to FIG. 3, another form of embodiment is shown of a melting plant for metal materials which, unlike the plant shown in FIG. 1, comprises a plurality of heating units 11, each independent of the other and each served by its own loading units 42, comparable to those previously described.

The material to be heated is loaded into each heating unit 11 by the respective loading unit 42.

In each of the containers 13 of the heating units 11 a reserve of heated material is generated that can be subsequently supplied, for example, as described above, to the transfer unit 25.

The presence of several heating units 11 allows to improve the heating times of the metal material in the container 13, which are longer than the melting times of the melting furnace 12 located downstream. This guarantees a speedy supply of material to the melting furnace 12 located downstream.

It is clear that modifications and/or additions of parts may be made to the plant 10 and method for melting metal materials as described heretofore, without departing from the field and scope of the present invention.

For example, as shown in the form of embodiment in FIGS. 2 and 3, the transfer unit 25 can be provided, on the opposite side with respect to the discharge aperture 29, with another discharge aperture 50 possibly associated with selective closing/opening means 51, through which to discharge the heated material.

This is particularly advantageous if it is necessary to interrupt the feed of material to the melting furnace 12 located downstream.

The discharge aperture 50 can be disposed at a first end of the conveyor belt 26, while the discharge aperture 29 can be disposed at the opposite end thereof.

By suitably commanding the rotation of the conveyor belt 26, in one direction or the other, it is possible to determine the selective discharge of the material through the discharge aperture 29 or the discharge aperture 50.

In correspondence with the discharge aperture 50 means 52 can be provided to collect the material, such as for example a basket.

It is also clear that, although the present invention has been described with reference to some specific examples, a person of skill in the art shall certainly be able to achieve many other equivalent forms of plant 10 and method for melting metal materials, having the characteristics as set forth in the claims and hence all coming within the field of protection defined thereby.

The invention claimed is:

1. A plant for melting metal materials comprising at least a heating unit provided with a container having a tapered configuration to contain mainly metal materials and with at least an induction heating device configured to heat the mainly metal materials contained in said container to a temperature comprised between 300° C. and 800° C. and keeping them in a solid state, said plant also comprising a transfer unit disposed downstream of said heating unit and configured to move, substantially continuously, said mainly metal materials exiting from the heating unit to a melting furnace located downstream of said heating unit and configured to melt said mainly metal materials, wherein said container is provided with an aperture through which said mainly metal materials, heated and in a solid state, is discharged onto said transfer unit, said transfer unit being configured to move with a pre-determined delivery rate and temperature said mainly metal materials, opening/closing members, governed by detectors of the flow of said mainly metal materials discharged through said aperture of said container, being associated with said aperture, commanded by an actuator and configured to open, close and choke said aperture in order to regulate the flow of said mainly metal materials that is discharged onto said transfer unit and sent to said melting furnace as a function of the requirements of the melting cycle in said melting furnace, wherein said opening/closing members comprise a vibrating feeder having a funnel configuration that is connected to a vibrating unit, and configured to facilitate the extraction of said mainly metal materials from said container.

2. The plant as in claim 1, wherein said opening/closing members comprise a sliding valve connected to said actuator and able to be selectively opened, closed, or choked by the action of said actuator.

3. The plant as in claim 2, wherein said detectors and said actuator are connected to a control and management unit configured to correlate at least the data detected by said detector and the process data of said melting furnace in order to command the activation of said actuator and to control the entity of opening of said sliding valve.

4. The plant as in claim 1, wherein said transfer unit comprises at least one of either a conveyor belt, a cup-type transporter, a plate conveyor belt.

5. The plant as in claim 4, wherein said transfer unit comprises a conveyor belt that extends between the heating unit and the melting furnace, and a protection body, or housing, in which the conveyor belt is inserted and kept substantially hermetically closed.

6. The plant as in claim 1, wherein said induction heating device comprises one or more coils mounted externally to said container.

7. The plant as in claim 6, wherein said coils are wound around a winding axis corresponding to the axis of axial development of said container.

8. The plant as in claim 1, wherein said heating unit comprises a plurality of induction heating devices associated with said container in different positions along the longitudinal extension of the latter.

9. The plant as in claim 1, wherein said detectors are directly mounted on said opening/closing members.

10. The plant as in claim 1, wherein said container comprises temperature sensors associated with the container, said temperature sensors being installed along walls of a tubular body of said container.

11. A method for melting metal materials comprising the heating of mainly metal materials in at least one container of a heating unit using an induction heating device which heats said mainly metal materials to a temperature comprised between 300° C. and 800° C. and keeping them in a solid state, said method also comprising the transfer, substantially continuously, of said mainly metal materials, by means of a transfer unit disposed downstream of said heating unit, from the heating unit to a melting furnace located downstream of said heating unit and in which said mainly metal materials are melted, wherein said mainly metal materials, heated and in a solid state, are discharged from said container to said transfer unit through an aperture of said container and are moved, in said transfer unit, with a pre-determined delivery rate and temperature said mainly metal materials, and in that opening/closing members, governed by detectors of the flow of said mainly metal materials discharged through said aperture of said container, are associated with said aperture in order to regulate the delivery rate of said mainly metal materials to said melting furnace, by opening, closing and choking said aperture as a function of the requirements of the melting cycle in said melting furnace, wherein said opening/closing members comprise a vibrating feeder having a funnel configuration that is connected to a vibrating unit, and configured to facilitate the extraction of said mainly metal materials from said container.

* * * * *